US012456837B1

(12) United States Patent
Yue

(10) Patent No.: US 12,456,837 B1
(45) Date of Patent: Oct. 28, 2025

(54) MAGNETIC SUCTION HEAD

(71) Applicant: Wenyong Yue, Guangdong (CN)

(72) Inventor: Wenyong Yue, Guangdong (CN)

( * ) Notice: Subject to any disclaimer, the term of this patent is extended or adjusted under 35 U.S.C. 154(b) by 0 days.

(21) Appl. No.: 18/644,150

(22) Filed: Apr. 24, 2024

(51) Int. Cl.
*H01R 13/50* (2006.01)
*H01R 13/60* (2006.01)

(52) U.S. Cl.
CPC ............. *H01R 13/50* (2013.01); *H01R 13/60* (2013.01)

(58) Field of Classification Search
CPC ................................ H01R 13/50; H01R 13/60
USPC ............................................................ 439/40
See application file for complete search history.

(56) References Cited

U.S. PATENT DOCUMENTS 2,074,330 A * 3/1937 Grover .................... C23C 2/405 271/31
7,478,927 B2 * 1/2009 Matthew ................. F21V 21/30 362/397
9,496,642 B1 * 11/2016 Fan ........................ H01R 13/22
9,774,137 B2 * 9/2017 Park ................... H01R 13/6683

FOREIGN PATENT DOCUMENTS

CN 212033345 U * 11/2020
CN 212725774 U * 3/2021
CN 212725838 U * 3/2021
CN 213278512 U * 5/2021
CN 213304903 U * 5/2021
CN 215184924 U * 12/2021
CN 216929085 U * 7/2022
CN 217182518 U * 8/2022
CN 217903567 U * 11/2022
CN 112204821 B * 12/2022 ............. H01R 13/03
CN 218005399 U * 12/2022
CN 218209154 U * 1/2023
CN 219739375 U * 9/2023
CN 219739420 U * 9/2023
CN 220401026 U * 1/2024
CN 220605044 U * 3/2024

* cited by examiner

*Primary Examiner* — Justin M Kratt

(57) ABSTRACT

A magnetic suction head includes a connecting wire, both ends of the connecting wire are provided with connecting heads, and two sets of the connecting heads are fixedly connected with the connecting wire through insulating layers respectively. Outer walls of two sets of the insulating layers are provided with magnetic sleeves, and the outer walls of the two sets of the insulating layers are magnetically suctioned together. By setting the magnetic sleeves at the two sets of the connecting heads, and the magnetic sleeves are molded by injection molding of a magnetic media and a plastic body. On the one hand, magnetic distribution is uniform, which is convenient for magnetic suction of the two sets of magnetic suction heads. On the other hand, it can reduce a weight and a structural dimension of the magnetic suction head, thereby improving usage experience.

3 Claims, 4 Drawing Sheets

MAGNETIC SUCTION HEAD

TECHNICAL FIELD

The present application relates to the technical field of data cables, and in particular to a magnetic suction head.

BACKGROUND

Data cable is a connecting wire commonly used in electronic devices. However, the data cable has a long length, and is generally stacked and twisted together when carrying, so it is often necessary to untangle the data cable when used, which is very troublesome, and its shape is not beautiful, taking up space. In order to facilitate storage of the data cable, magnetic storage data cables have appeared on the market, and a head of the magnetic storage data cable also has a magnetic effect.

In existing technologies, when a magnetic suction head is stored, two sets of magnetic suction heads are suctioned to each other by using magnetic suction portions (or magnet block, or magnetic suction ring). However, the magnetic suction portions (or magnet block, or magnetic suction ring) of two sets of the magnetic suction heads need to be aligned in order to be suctioned. Therefore, they are inconvenient to use. In addition, when the magnetic suction head uses the magnetic suction ring, to ensure the strength of the magnetic suction ring, a wall of the magnetic suction ring needs to be more than 1.5 mm, then an overall diameter of the magnetic suction ring will be increased by more than 3 mm, in a case of the same conductive parameters, which results in the diameter of this connecting wire will be increased by a lot of weight, thereby affecting usage experience.

SUMMARY

The present disclosure aims to provide a magnetic suction head to address problems that magnetic suction heads in the existing technologies are more inconvenient to use, or have a poor usage experience.

To achieve the above objectives, the present disclosure adopts the following technical solutions. In some embodiments of the present disclosure, a magnetic suction head is provided, including a connecting wire, both ends of the connecting wire are provided with connecting heads, and two sets of the connecting heads are fixedly connected with the connecting wire through insulating layers respectively. Outer walls of two sets of the insulating layers are provided with magnetic sleeves, and the outer walls of the two sets of the insulating layers are magnetically suctioned together.

To make the magnetic sleeves can be magnetic, preferably, the magnetic sleeves each include a plastic body with a magnetic medium built in.

To facilitate production of the magnetic sleeves and also to enable the magnetic medium to be evenly distributed within the magnetic sleeves, preferably, the plastic body is injection molded with the magnetic medium.

To facilitate installation of the magnetic sleeves, preferably, the magnetic sleeves each have a cross section with a waist-shaped ring structure.

Preferably, the connecting wire has a wire fixedly provided inside thereon, and both ends of the wire are electrically connected to the connecting heads.

Preferably, the magnetic suction head further includes an adhesive fixedly disposed on outer walls of the insulating layers, and the outer walls of the insulating layers are fixedly connected to inner walls of the magnetic sleeves.

Compared with the existing technologies, the magnetic suction head provided by the present disclosure has at least following beneficial effects and advantages.

1. The magnetic suction head of the present disclosure, by setting the magnetic sleeves at the two sets of the connecting heads, and the magnetic sleeves are molded by injection molding of the magnetic media and the plastic body. On the one hand, magnetic distribution is uniform, which is convenient for magnetic suction of the two sets of magnetic suction heads. On the other hand, it can reduce the weight and a structural dimension of the magnetic suction head, thereby improving usage experience.

2. The magnetic suction head of the present disclosure, by fixedly connecting the magnetic sleeves with the insulating layers by means of the adhesive, which has a reliable fixed effect. Moreover, the inner walls of the magnetic sleeves are tightly adhered to the outer walls of the insulating layers, which can contribute to improve the usage effect.

Other parts not related in the magnetic suction head of the present disclosure are the same as the existing technologies, or may be realized by using the existing technologies. The magnetic suction head of the present disclosure, by setting the magnetic sleeves at the two sets of the connecting heads, and the magnetic sleeves are molded by injection molding of the magnetic media and the plastic body. On the one hand, magnetic distribution is uniform, which is convenient for magnetic suction of the two sets of magnetic suction heads. On the other hand, it can reduce the weight and the structural dimension of the magnetic suction head, thereby improving usage experience.

Figure 1:
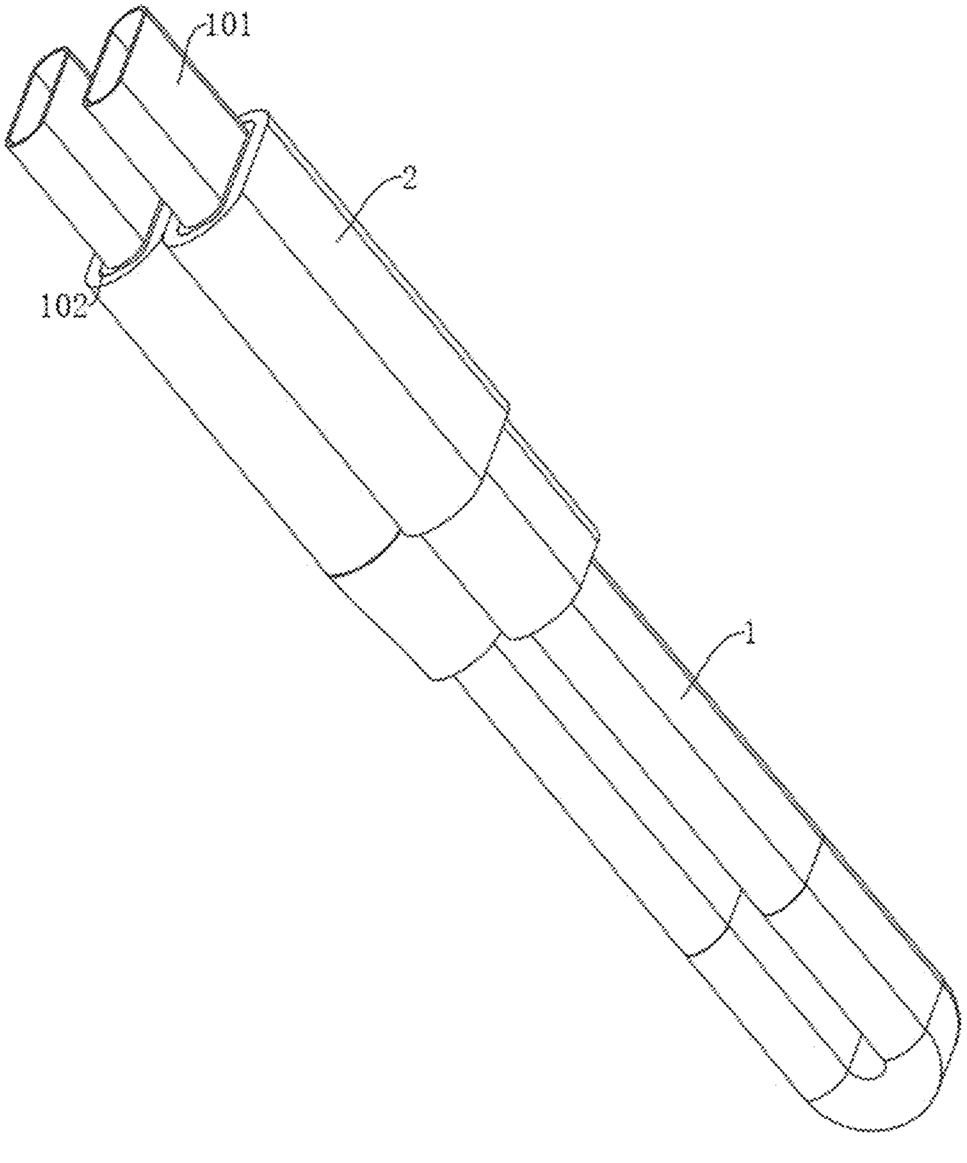
FIG. 1 shows a structural schematic diagram of a magnetic suction head in accordance with some embodiments of the present disclosure.
Figure 2:
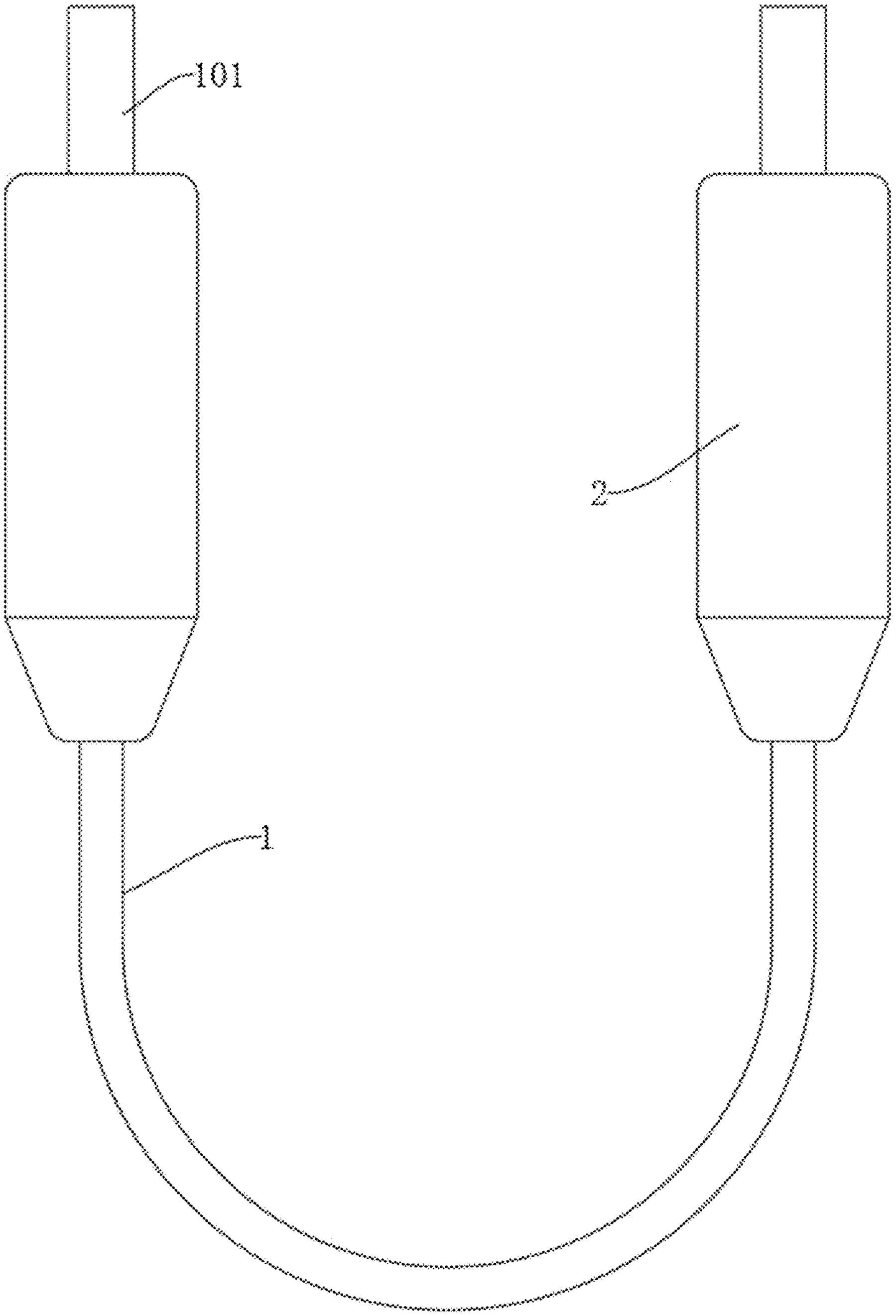
FIG. 2 shows a side view of the magnetic suction head in accordance with some embodiments of the present disclosure.

In the drawings, reference signs are as follows, 1. Connecting wire, 101. Connecting head, 102. Insulating layer, 2. Magnetic sleeve, 3. Adhesive.

DETAILED DESCRIPTION OF THE EMBODIMENTS

The technical solutions in embodiments of the present disclosure will be clearly and completely described below in conjunction with accompanying drawings in the embodiments of the present disclosure. Obviously, described embodiments are only a part of the embodiments of the present disclosure and not all of the embodiments of the present disclosure.

In the description of the present disclosure, it should be understood that terms “up”, “down”, “front”, “back”, “left”, “right”, “top”, “bottom”, “inside”, “outside”, and the like indicating orientation or positional relationships are based on those shown in the accompanying drawings, and are intended only for the purpose of facilitating the description of the present disclosure and simplifying the description, and are not intended to indicate or imply that a device or an element referred to must have a particular orientation, be constructed and operated in a particular orientation, and therefore is not to be construed as a limitation of the present invention.

Embodiment 1

Referring to FIG. 1 to FIG. 4, in embodiment 1 of the present disclosure, a magnetic suction head is provided, including a connecting wire 1. Herein the connecting wire 1 is an existing magnetic suction storage data cable, and there are magnetic rings set at equal intervals on an outer wall thereon, this allows the connecting wire 1 at an upper and a lower layers or adjacent connecting wires 1 to be magnetically attracted to each other by using the magnetic rings, which facilitates storage, avoids mutual entanglement and leads to subsequent disassembly difficulties, but also improve aesthetics and reduce space occupied. Both ends of the connecting wire 1 are provided with connecting heads 101, and two sets of the connecting heads 101 are fixedly connected with the connecting wire 1 through insulating layers 102 respectively. The insulating layers 102 are made of polyvinyl chloride, thermoplastic elastomers, thermoplastic polyurethanes, silicone, and nylon, etc. Herein the insulating layers 102 are preferred thermoplastic elastomers, which are abrasion- and stretch-resistant and can improve the service life of the connecting wire 1. Moreover, outer walls of two sets of the insulating layers 102 are provided with magnetic sleeves 2. When storing, the outer walls of two sets of the magnetic sleeves 2 can be magnetically suctioned to each other. For a short wire, two sets of the magnetic sleeves 2 are suctioned to each other, which is easy to store, and the same is true for a long wire. During using, it is also possible to attach the magnetic sleeves 2 to a magnetic suction metal on a table, or to affix a metal sheet on the table, and then the magnetic suction head is suctioned to the metal sheet, the connecting wire 1 is fixed to a fixator, which can reduce use of the fixator of the connecting wire 1, and help to reduce usage cost and improve usage effect.

When in use, by setting the magnetic sleeves 2 at the two sets of the connecting heads 101, and the magnetic sleeves 2 are injection molded from a magnetic medium and a plastic body. On the one hand, magnetic distribution is uniform, which is convenient for magnetic suction of the two sets of magnetic suction heads. On the other hand, it can reduce the weight and the structural dimension of the magnetic suction head, thereby improving usage experience. By fixedly connecting the magnetic sleeves 2 with the insulating layers 102 by means of the adhesive 3, which has a reliable fixed effect. Moreover, the inner walls of the magnetic sleeves 2 are tightly adhered to the outer walls of the insulating layers 102, which can contribute to improve the usage effect.

Figure 3:
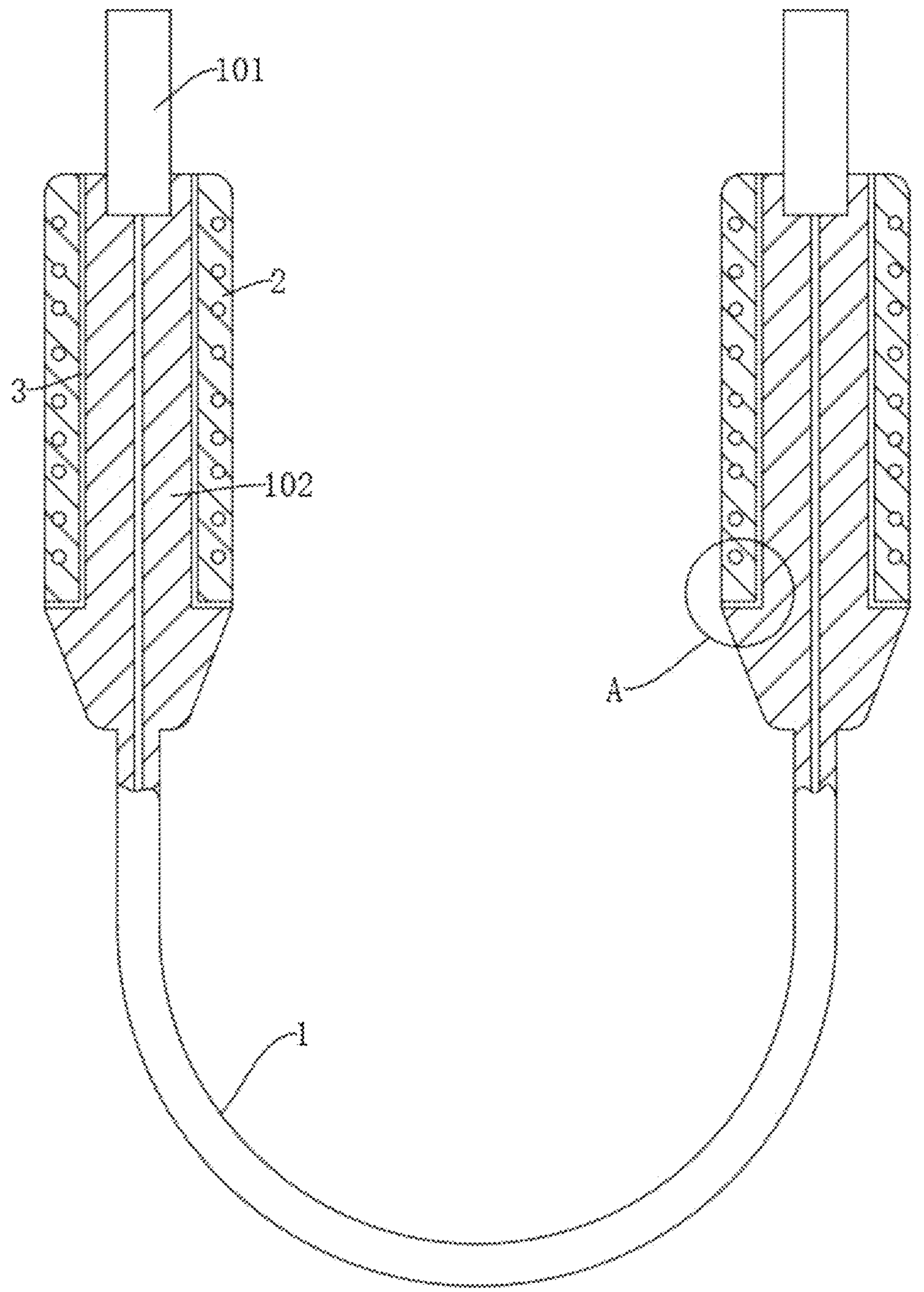
FIG. 3 shows a section view of the magnetic suction head in accordance with some embodiments of the present disclosure.
Figure 4:
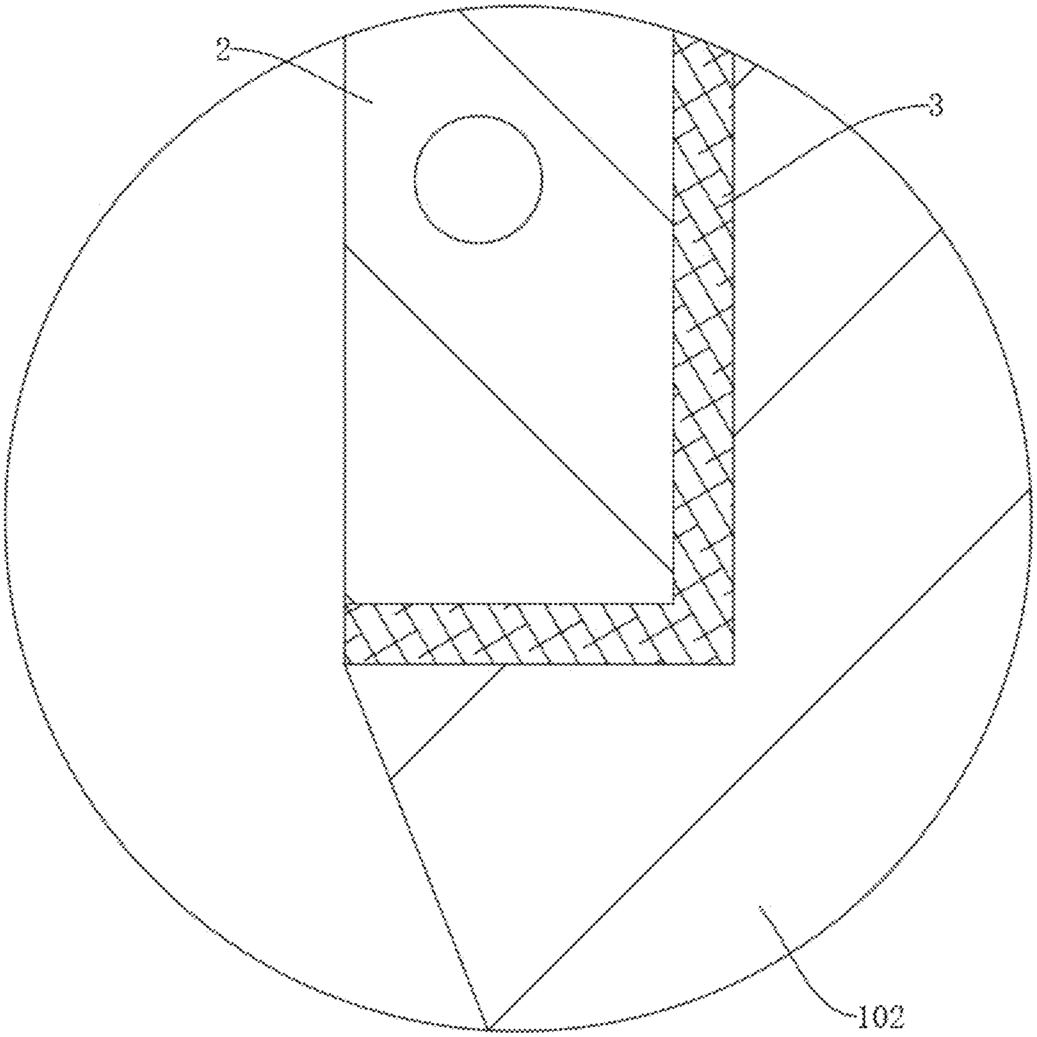
FIG. 4 shows an enlarged view of part A in FIG. 3.

Referring to FIG. 3, the magnetic sleeves 2 includes the plastic body and the magnetic medium. The magnetic medium is a magnetic powder, and the plastic body and the magnetic medium are molded integrally by injection molding. When in use, the magnetic medium and plastic particles are mixed sufficiently to ensure that the magnetic medium is uniformly distributed throughout the plastic particles, and then mixed plastic particles and the magnetic medium are put into an injection molding machine for injection molding. And at high temperatures and under high pressures, the plastic will melt and fill a mold, at the same time, the magnetic medium will also be cured in the plastic, after the plastic is cooled and cured, the mold is opened and a molded product is taken out. At this time, the magnetic medium in the product has been combined with the plastic together, to make the magnetic sleeves 2 magnetic. And finally, the magnetic sleeves 2 are placed in an external magnetic field, magnetic poles are formed on surfaces of the magnetic sleeves 2 through the action of the external magnetic field, to facilitate the two sets of magnetic sleeves 2 to be suctioned to each other. Moreover, by injection molding, the thickness of the magnetic sleeves 2 can be appropriately reduced, thereby improving usage effect.

Referring to FIG. 1, the magnetic sleeves 2 each have a cross section with a waist-shaped ring structure, which facilitates formation of the magnetic poles on the surface of the magnetic sleeves 2. When in use, by designing the magnetic sleeves 2 as the waist-shaped ring structure, it is convenient to be sleeved on the outer wall of the insulating layers 102, thereby improving speed of installation, and also improving production efficiency.

Referring to FIG. 3, the connecting wire 1 has a wire fixedly provided inside thereon, and both ends of the wire are electrically connected to the connecting heads 101. When in use, by electrically connecting the two sets of the connecting heads 101 via the wire, data or energy transmission can be carried out, thereby improving the usage effect.

Referring to FIG. 3, the magnetic suction head further includes an adhesive 3 fixedly disposed on outer walls of the insulating layers 102, and the outer walls of the insulating layers 102 are fixedly connected to inner walls of the magnetic sleeves 2. When in use, the adhesive 3 is applied on the outer wall of the insulating layers 102, and then the magnetic sleeves 2 are sleeved on the outer walls of the insulating layers 102, thus the magnetic sleeves 2 are fixed on the insulating layers 102. Such fixing effect is reliable and inner walls of the magnetic sleeves 2 fits tightly with the outer walls of the insulating layers 102, which helps to improve the usage effect. Moreover, an inner wall size of the magnetic sleeves 2 can be appropriately reduced to sleeve directly on the outer walls of the insulating layers 102 and connect with the outer walls of the insulating layers 102 in an interference fitting.

The foregoing description is only some better specific implementations of the present disclosure, but the scope of protection of the present disclosure is not limited thereto, any skilled person in the art familiar with the technical field within the technical scope of the present disclosure, by making equivalent substitutions or changes in accordance with the technical solution and concept of the present disclosure, shall be covered by the scope of protection of the present invention.

What is claimed is:

1. A magnetic suction head, comprising a connecting wire, both ends of the connecting wire are provided with connecting heads, and two sets of the connecting heads are fixedly connected with the connecting wire through insulating layers respectively;

wherein outer walls of two sets of the insulating layers are provided with magnetic sleeves, and the outer walls of the two sets of the insulating layers are magnetically suctioned together;

an adhesive is disposed between an outer wall of each insulating layer and an inner wall of the corresponding magnetic sleeve, and the adhesive is configured to fixedly secure the insulating layer to the magnetic sleeve;

wherein the magnetic sleeves each comprise a plastic body with a magnetic medium built in, the plastic body is injection molded with the magnetic medium, and the plastic body is injection molded with the magnetic medium; and wherein each insulating layer, its magnetic sleeve, and its connecting head together form a magnetic suction head, two magnetic suction heads being arranged on respective opposite ends of the connecting wire and fixedly connected thereto.

2. The magnetic suction head according to claim 1, wherein the magnetic sleeves each has a cross section with a waist-shaped ring structure.

3. The magnetic suction head according to claim 1, wherein the connecting wire has a wire fixedly provided inside thereon, and both ends of the wire are electrically connected to the connecting heads.

* * * * *